Oct. 27, 1959     S. G. BEST     2,910,125
HYDROMECHANICAL FUEL CONTROL FOR VARIABLE-PITCH
PROPELLER POWER PLANT
Filed July 14, 1954     5 Sheets-Sheet 1

INVENTOR
STANLEY G. BEST
BY Leonard F. Wehlund
ATTORNEY

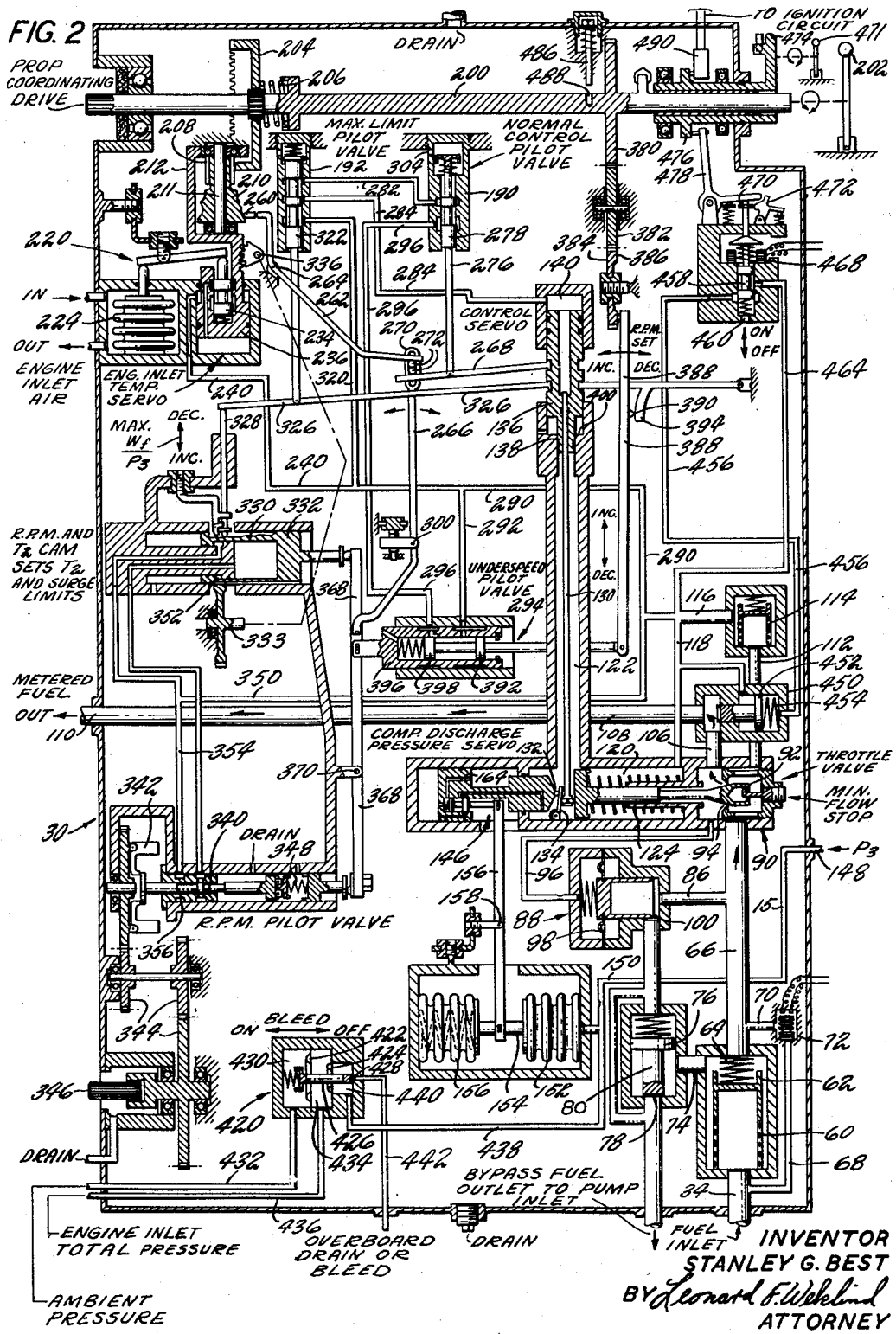

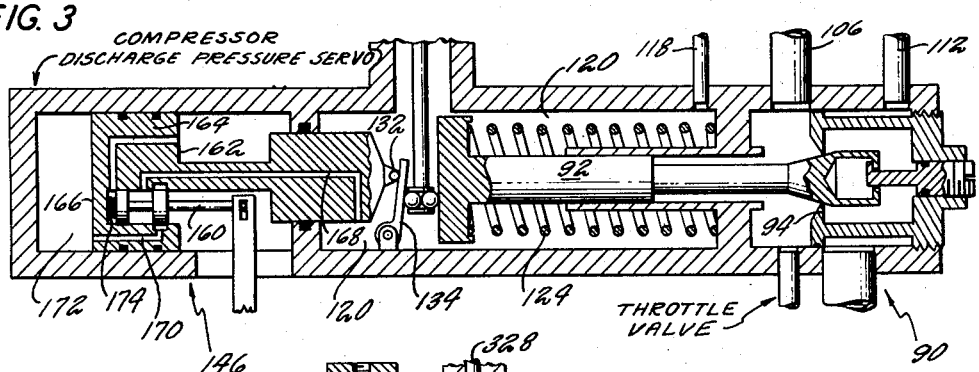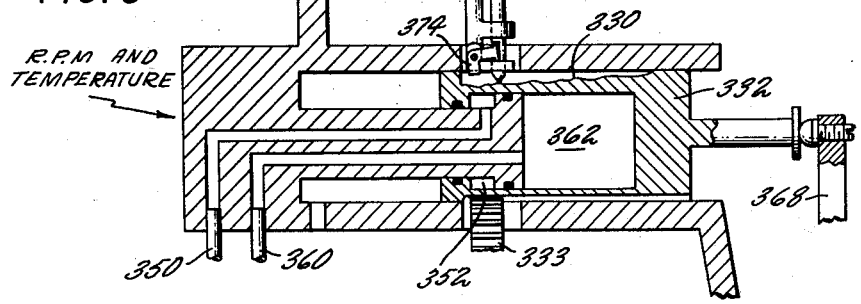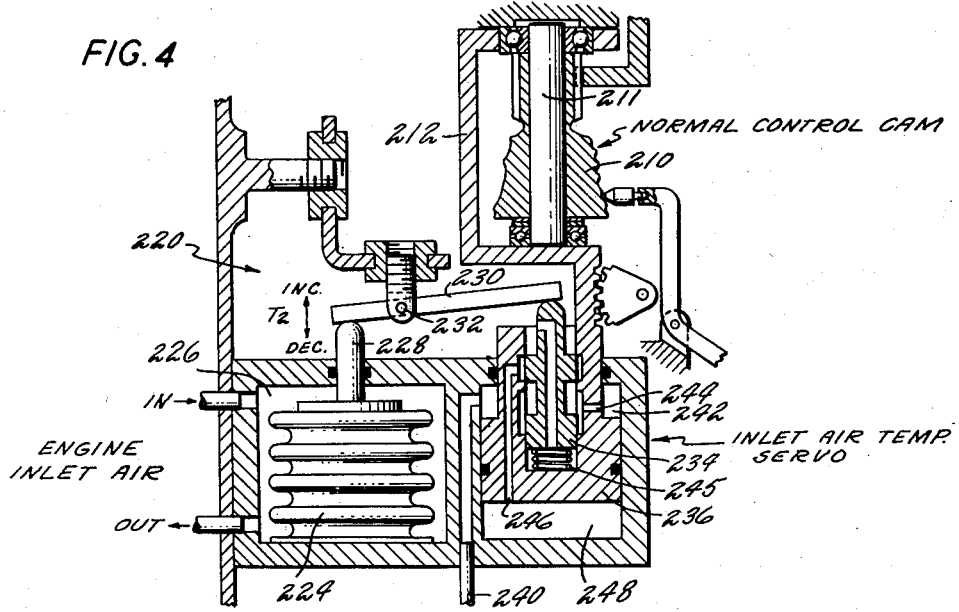

Oct. 27, 1959  S. G. BEST  2,910,125
HYDROMECHANICAL FUEL CONTROL FOR VARIABLE-PITCH
PROPELLER POWER PLANT
Filed July 14, 1954  5 Sheets-Sheet 4

INVENTOR
STANLEY G. BEST
BY Leonard F. Wekland
ATTORNEY

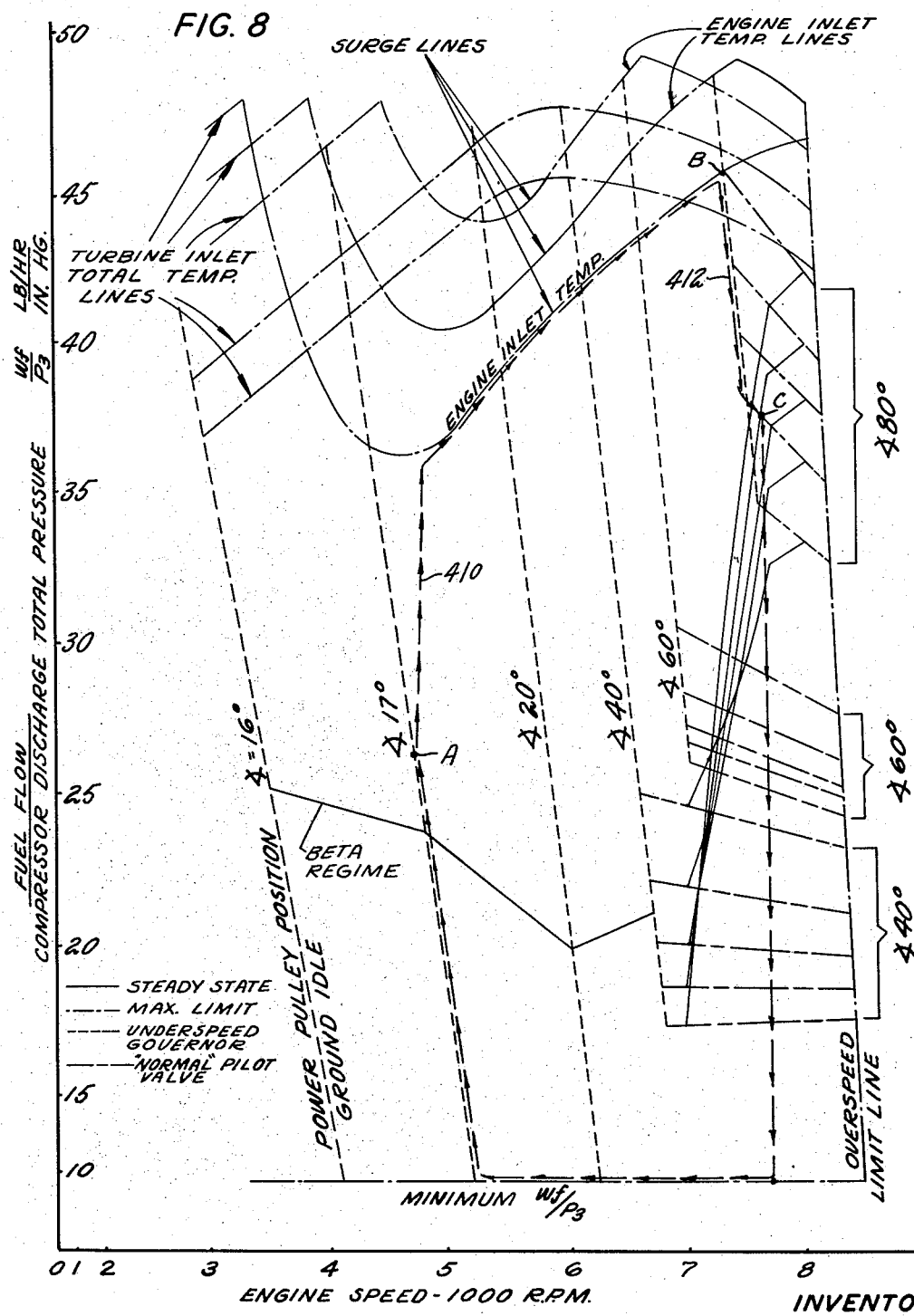

United States Patent Office 2,910,125
Patented Oct. 27, 1959

2,910,125

HYDROMECHANICAL FUEL CONTROL FOR VARIABLE-PITCH PROPELLER POWER PLANT

Stanley G. Best, Manchester, Conn., assignor to United Aircraft Corporation, East Hartford, Conn., a corporation of Delaware Application July 14, 1954, Serial No. 443,261

12 Claims. (Cl. 170—135.72)

This invention relates to fuel controls and more particularly to fuel controls for turbine type power plants.

It is an object of this invention to provide a fuel control for turbine power plants comprising a hydromechanical system which is free of sticking and is rugged while at the same time providing accurate fuel metering.

It is a further object of this invention to provide a fuel control utilizing power plant speed, inlet air temperature, and compressor discharge pressure as parameters of power operation for controlling the flow of fuel.

It is a still further object of this invention to provide a fuel control which is particularly adaptable to turboprop power plant combinations.

These and other objects of this invention will become readily apparent from the following description of the drawings in which:

Fig. 2 is a schematic illustration in partial cross section of the fuel control metering system.

Fig. 3 is an enlarged detail schematic of the throttle valve mechanism and compressor discharge pressure servo.

Fig. 4 is an enlarged detail schematic of the normal control cam mechanism and the inlet air temperature servo.

Fig. 5 is an enlarged schematic of the r.p.m. servo and the r.p.m. and inlet temperature cam for maximum limiting of fuel flow.

Fig. 8 is a showing of typical power plant characteristic curves including a diagrammatic showing of a typical acceleration and deceleration operation.

The particular power plant parameters of operation utilized in the fuel control system described herein are generally similar to those utilized in my copending patent application Serial No. 244,551, filed August 31, 1951, now Patent No. 2,822,666, for Hydromechanical Fuel Control.

Figure 1:
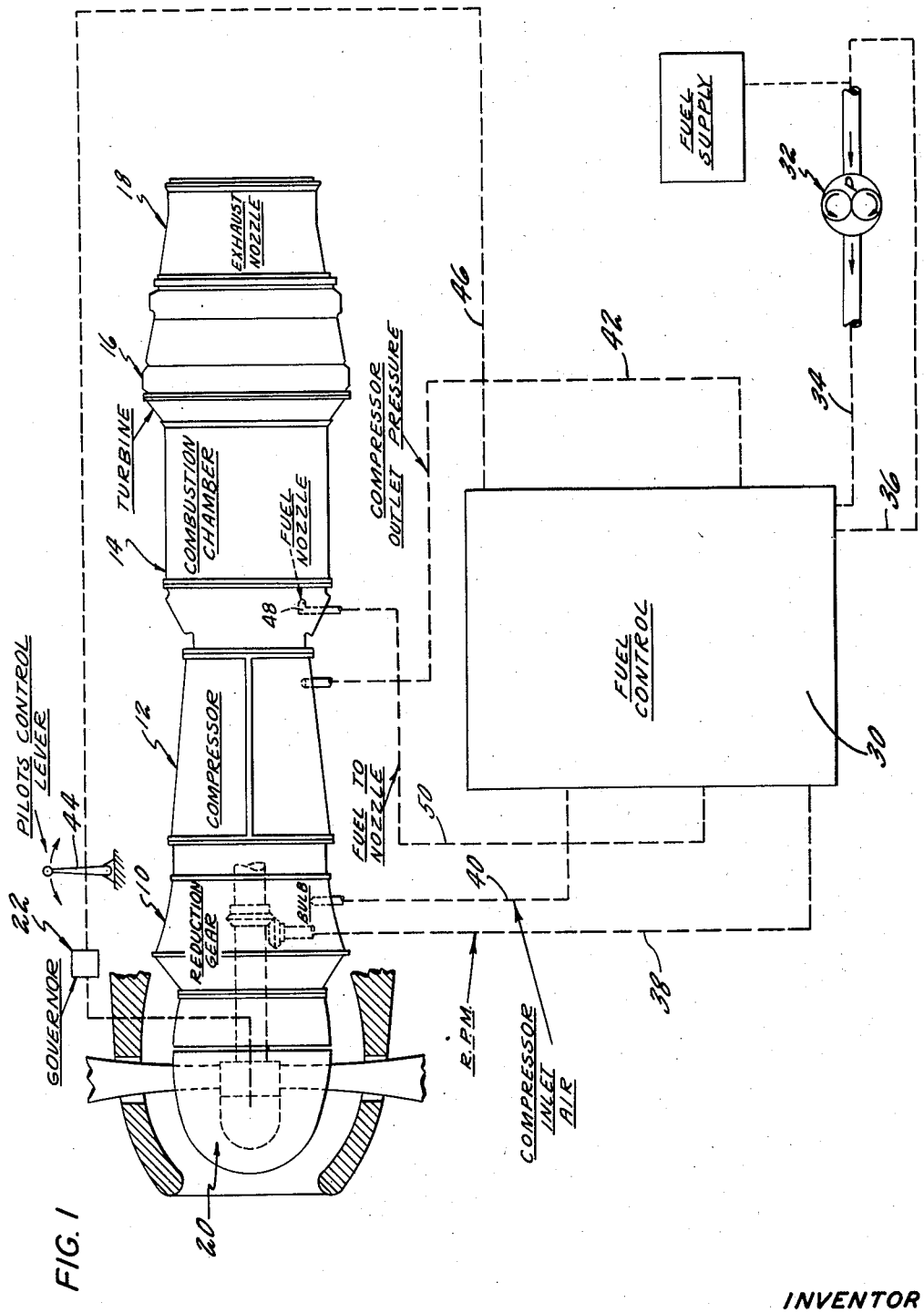
Fig. 1 is a schematic illustration of a power plant having a propeller and fuel control according to this invention.

Referring to Fig. 1, a turboprop power plant is schematically illustrated and includes a nose reduction gearing generally indicated at 10, a compressor section 12, a combustion section 14, a turbine 16 and an exhaust nozzle 18. The reduction gearing 10 is operatively connected to at least a portion of the turbine and is drivingly connected to a variable pitch propeller generally indicated at 20. The propeller has a governor 22 which can be set so as to govern propeller speed by controlling the pitch of the blades by any suitable pitch changing mechanism.

The fuel control 30 receives fuel from a supply source and a pump 32 via line 34. An adjacent fuel line 36 leads back to the pump inlet in a manner to be described hereinafter. The fuel control 30 receives signals commensurate with the value of several parameters of power plant operation. Thus an r.p.m. or speed signal is obtained via the connection 38, compressor inlet air for temperature sensing is received via connection 40, compressor discharge pressure is sensed via connection 42 and a power control lever 44 provides a signal of power lever setting via the connection 46. The power lever 44 is also operatively connected to the governor 22 so that the propeller speed setting of the governor is some desired function of power lever setting. Fuel is fed to the combustion chamber 14 by one or more nozzles 48 by means of connection 50 leading from the fuel control.

Referring to Fig. 2, a fuel control 30 is schematically illustrated therein. Fuel from the pump 32 (Fig. 1) enters the fuel control casing in the lower right-hand corner via the line 34 through a filter 60 which incorporates a spring loaded by-pass valve 62. Thus when the pressure drop through the filter element 60 exceeds for example 25 p.s.i., the spring 64 will be compressed so that the fuel may flow around the filter element. After passing through the filter it flows upwardly into the line 66. A pair of pressure taps 68 and 70 communicate with the upstream and downstream end of the filter unit and pass a signal to a pressure sensitive switch 72 which actuates a "clogged filter" indicator light in the pilot's cockpit. Another line 74 runs from the left of the filter unit to a spring loaded relief valve 76 which has a port 78 which can be opened by the valve stem 80 when the desired maximum fuel pressure of for example 600 p.s.i. is reached.

Before reaching the main throttle valve fuel passes up the line 66 and to a line 86 leading to a by-pass type pressure regulating valve generally indicated at 88 for controlling the pressure drop across the main throttle valve. The main throttle valve generally indicated at 90 includes a movable member 92 which varies the area of the metering orifice 94.

The pressure regulating by-pass valve 88 senses pressure upstream of the metering orifice 94 via the line 86 and also senses the pressure on the downstream side of the metering orifice 94 via the line 96. The valve 88 serves to maintain a constant pressure drop across the metering orifice 94 of the throttle valve regardless of any system back pressure. Therefore, should, for example, the pilot's power lever be advanced to call for more power the eventual result would be that the movable contoured element 92 of the throttle valve would move to the right increasing the area of the metering orifice 94. The flow of the existing fuel through the new orifice area causes a reduction in pressure drop across the orifice such that the diaphragm 98 of the pressure regulating valve is displaced to the right restricting the by-pass area 100 and increasing the fuel flow to the throttle valve with a corresponding increase in the pressure drop across the throttle valve orifice 94 to any desired set value, as for example 100 p.s.i. The metered fuel from the throttle valve then flows via the passages 106 and 108 through the outlet 110 and thence to the power plant injection nozzles. The fuel from the upstream side of the metering orifice 94 also flows upwardly via the line 112 through a filter element 114 which includes a by-pass feature similar to the filter unit 60, 62, 64, described above.

The fuel flowing upwardly through the line 112 and the filter 114 is unmetered fuel and is at pump outlet pressure and flows via the line 116 to all of the servo operated devices of the fuel system. Initially fuel flows in the line 118 to the chamber 120 within the throttle valve casing. This fuel under high pressure is then also conducted into the space indicated at 122 for reasons to be described hereinafter.

The movable throttle valve member 92 (better seen in Fig. 3) is biased toward a throttle closed position by a spring 124. The valve element 92 is moved toward a controlled open position by a linkage which multiplies the motion of a servo operated rod 130 and a servo operated element 132. The bottom of the rod 130 carries a pair of rollers one of which engages the throttle valve element 192 and the other of which engages a pivoted arm 134. The arm 134 is engaged also by the element 132. The member 132 is translated by its respective servo motor along the axis of the movable element 192 while the rod 130 is moved by its servo motor transversely of this axis.

The rod 130 is controlled in its movement by a servo piston 136 connected thereto at its upper end. High pressure fuel within the chamber 122 acts on the small area 138 of the control servo piston 136 while high or low pressure is fed to the upper side of the piston 136 into the chamber 140. When low pressure is admitted to the chamber 140 the servo piston 136 and the rod 130 are moved upwardly to effectively increase the flow of fuel through the throttle valve 90 and vice versa. It will be apparent that when high pressure fuel is admitted to the chamber 140 the piston 136 will move downwardly because its upper area is greater than the lower area 138.

The element 132 which moves the throttle valve element 92 along its axis is moved itself by a servo generally indicated at 146 and operative in response to a compressor discharge pressure signal as follows.

Compressor discharge pressure is brought into the right-hand side of the fuel control casing at 148 and via a line 150 into a bellows 152. The free end of the bellows 152 is connected by a rod 154 to the free end of an evacuated bellows 156. Motion of the rod 154 will then be proportional to compressor discharge pressure absolute. The rod 154 connects to a vertical member 156 adjustably pivoted at 158 intermediate its ends. The upper end of the member 156 is connected to a pilot valve 160 better seen in Fig. 3. Since the entire inside case of the fuel control is under drain pressure the right-hand face 162 of the piston 164 will be exposed continuously to this low pressure. The left-hand face 166 of the piston 164 may be alternately exposed to high pressure or drain pressure. Thus if the pilot valve 160 is moved to the right, high pressure fluid from the throttle valve chamber 120 is conducted via line 168 to the line 170 and then to the chamber 172 on the left side of the piston 164. Likewise, if the pilot valve 160 is moved to the left, low pressure can be conducted directly into the line 170 and then to the chamber 172. It should be noted that a small spring 174 engages the left-hand end of the pilot valve to bias it toward the right slightly and to damp vibrations. The compressor discharge servo just described is capable of amplifying both the force and the motion of the sensing bellows 152. In addition, the servo piston 164 has a right-hand area continuously exposed to drain pressure and a left-hand area approximately twice as large as the first mentioned area which can be alternately exposed to high pressure or drain pressure by movement of the pilot valve 160 thus giving a double acting servo capable of equal output force in both directions of actuation. By utilizing the simple single land pilot valve for control, position accuracy is insured. This servo system is similar to all of the servo systems utilized in this control.

Since the metering orifice of the throttle valve is varied in area as a function of the product of the motion of the compressor discharge servo and its attached member 132 and as a function of the motion of the servo piston rod 130, the position of the main throttle valve element 92 is a function of scheduled fuel flow per unit compressor discharge pressure referred to herein as $$\frac{W_F}{P_3}$$

The main servo control piston 136 is positioned by three pilot valves so linked together that the proper pilot valve controls the position of the control servo piston 136 at any specific condition of operation. These pilot valves are designated normal control pilot valve, the maximum limit pilot valve and the underspeed governor pilot valve. These valves are actuated by various sensing and scheduling mechanisms responsive to various parameters of power plant operation. For normal operation at or near steady state conditions, the normal control pilot valve 190 positions the servo piston 136 such that the ratio of fuel flow to compressor discharge pressure is scheduled as a function of power lever setting, biased by r.p.m. and engine inlet temperature designated hereinafter as $T_2$. The maximum limit pilot valve 192 controls the position of the servo piston 136 during maximum limit conditions during acceleration. The normal control pilot valve 190 and the maximum limit pilot valve 192 are connected in series with the control chamber 140 adjacent the top of the control piston 136. The operation of these particular valves will be described hereinafter.

As stated above, during steady state conditions the normal control pilot valve controls the position of the servo piston 136 as a function of power lever position biased by r.p.m. and $T_2$. Adjacent the upper part of the fuel control casing a shaft 200 is provided which shaft passes through the casing with the right-hand end being operatively connected to the pilot's control lever 202. Movement of the pilot's control lever 202 rotates the shaft 200 which in turn rotates a ring gear 204 which is biased to the left by a spring 206. The teeth of the ring gear 204 engage cooperating teeth 208 integral with a profiled three-dimensional cam 210 suitably mounted for rotation about its shaft 211 in a cage 212. It is thus apparent that movement of the pilot's control lever 202 will cause rotation of the shaft 200 and also rotation of the three-dimensional cam 210. The cam 210 and its cage 212 are reciprocated by an inlet air temperature responsive servo system generally indicated at 220 and more clearly illustrated in Fig. 4. As seen in Fig. 4, a bellows 224 is shown located in a chamber 226 through which compressor inlet air is circulated. The bellows is filled with a suitable liquid which will expand and contract with variations in temperature so that movement of the pin 228 will be commensurate with variations in inlet air temperature. The pin 228 bears against one end of an arm 230 adjustably pivoted at 232. The other end of the arm 230 engages the upper end of a pilot valve 244 which controls the position of a servo piston 236. A light spring 245 engages the bottom of the pilot valve and biases it in an upward direction. High pressure fluid is fed to the line 240 from the pressure supply line and manifold 116 (Fig. 2). Movement of the pilot valve 234 upwardly connects the line 240, annulus 242 and passage 244 to the passage 246 so that high pressure fluid will flow into the chamber 248 and react on the bottom of piston 236. Conversely, downward movement of the pilot valve 234 will connect the line 246 directly with the drain pressure which surrounds the upper portion of the pilot valve and piston. Although the bottom face of the piston 236 is very large it will move downwardly under these conditions since high pressure is continuously exerted in the annulus 242. The motion of the piston 236 vertically reciprocates the cage 212 and the three-dimensional cam 210 along the axis of the latter.

Referring to Fig. 2, a cam follower 260 is actuated by the cam 210. The cam follower 260 is connected to a linkage system comprising a link 262 pivoted at 264, a link 266 and also a link at 268. The links 262, 266, 268 are operatively connected together by a yoke 270 which carries a pair of rollers 272 therein for engagement with the ends of the links 262 and 268. The cam follower 260 and its connected link 262 are moved as a function of the power lever setting and engine inlet air temperature ($T_2$) and as modified by the contoured three-dimensional cam 210. Each of the links 262, 266 and 268 are operatively connected to the rod 276 which controls the position of the movable valve element 278 in the sleeve of the normal control pilot valve 190. The link 266 is an r.p.m. biasing link while the link 268 is a follow-up lever. Since the ordinates of the three-dimensional cam 210 vary with power lever position and $T_2$ the normal control pilot valve 190 is able to schedule various families of droop lines such as seen in Fig. 8. The r.p.m. biasing lever 266, which is actuated through a control r.p.m. sensing system to be described hereinafter, is actuated in such a manner that for a fixed normal control position of the three-dimensional cam 210 the position of the main servo piston 136 can be varied over a small range as a function of turbine speed. The slope of the normal control pilot valve droop lines may be varied by design changes in the linkage system.

Isolating just the normal control pilot valve we can describe its operation. The valve element 278 supplies high or drain pressure through the lines 282 and 284 to the chamber 140 adjacent the top of the main servo piston 136. If the movable valve element 278 is moved upwardly, high pressure fluid will flow from the small filter unit 114 located along the right-hand casing wall of the fuel control to the line or manifold 116 then to the line 290 downwardly through the line 292 through the underspeed pilot valve 294 (to be described hereinafter) when in its shown position, upwardly through the line 296 then through the normal control pilot valve to the line 282. High pressure fluid then flows through the maximum limit pilot valve 192 and then to the line 284 and finally to the chamber 140 above the main servo piston 136. Applying high pressure fluid to the chamber 140 tends to reduce engine fuel flow. Since applying high pressure in this manner reduces fuel flow it may readily be seen that for a fixed position of the link or lever 262 (which follows cam 210) it can be seen that movements of the lever 266 about its pivot 300 can cause the yoke 270 and the rollers 272 to move along the link 268 thereby varying the position of the movable valve element 278 of the normal controlled pilot valve 190. Increasing r.p.m. causes a counterclockwise motion of the upper end of lever 266 such that the movable valve element motion to meter high or drain fuel pressure to the chamber 140 of the main servo piston 136 for a function of the slope of that portion of lever 262 which is tangent to the rollers 272. This slope is established as a function of power lever position and $T_2$ to increase or decrease fuel flow with variations in r.p.m. depending on engine operating requirements. It is obvious that when high pressure is conducted to the chamber 140 and the main servo piston 136 is moved downwardly, the lever 268 will also move to move the valve element 278 of the normal control pilot valve to a neutral position. Downward movement of the valve element 278 will conduct low pressure to the line 282 by means of a port 304 in the upper casing of the normal control pilot valve 190. Thus the piston 136 will move upwardly to increase fuel flow.

For accelerating fuel flow limiting, the maximum limit pilot valve 192 positions the main control servo piston 136 such that $$\frac{W_F}{P_3}$$

is scheduled as a function of r.p.m. and $T_2$ to meet the turbine inlet temperature and pressure surge limitations of the power plant. In addition, means to be described hereinafter are provided for cutting fuel flow back sharply to provide overspeed protection when an engine speed above a predetermined r.p.m. is reached. The maximum limit pilot valve 192 is supplied high pressure fuel via a line 320 so that when the central valve element 322 is moved upwardly, high pressure fluid is supplied to the line 284 and the chamber 140 to move the main control servo piston 136 downwardly to reduce fuel flow. Likewise, downward movement of the element 322 of the maximum limit pilot valve will conduct low pressure fuel from the normal control pilot valve (when in proper position) and from the line 282 to the line 284 and the chamber 140. It should be noted that the maximum limit pilot valve being in series with the normal control pilot valve is capable of taking over control. The movable element 322 of the maximum limit pilot valve is actuated through a walking beam type follow-up linkage 326 and 328 by a three-dimensional cam 330 (see also Fig. 5) cut on the outside of the r.p.m. servo piston 332 so as to position the main control servo piston 136 as a function of cam profile. The cam 332 is rotated in response to engine inlet temperature by means of a gear 333 operatively connected (by dotted line) to a gear segment 336 which is rotated by movement of the engine inlet air temperature servo piston 236.

Figure 6:
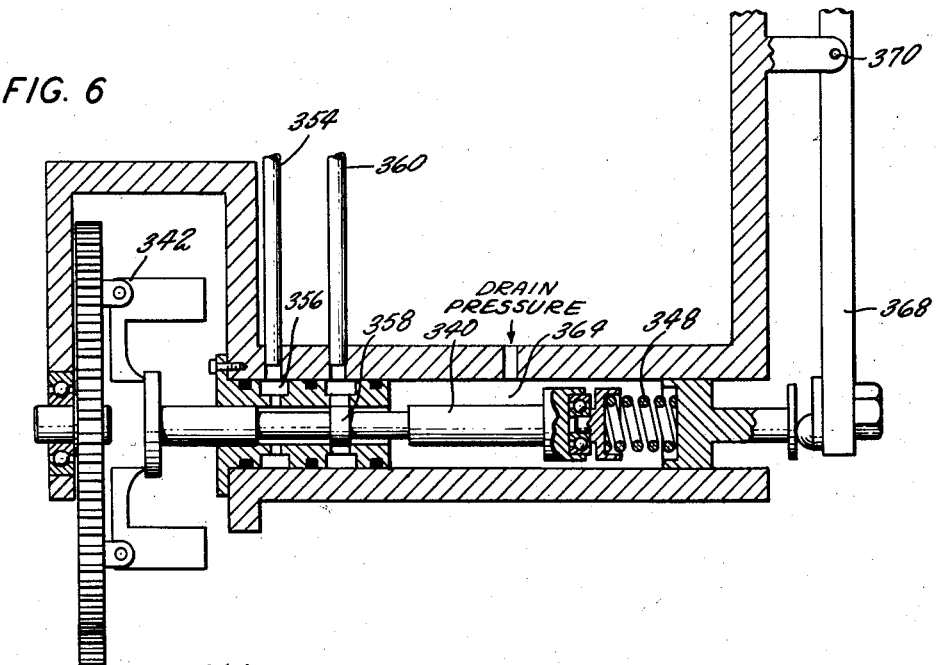
Fig. 6 is an enlarged schematic of the r.p.m. pilot valve.

The piston 332 is reciprocated in response to controlling movements of the r.p.m. pilot valve 340 (see also Fig. 6).

The r.p.m. pilot valve forms a part of the engine r.p.m. sensing system. This system, shown in Figs. 2, 5 and 6, incorporates a positioning type servo having a flyball head 342 driven by a gear train 344. The gear train 344 is in turn driven by a splined shaft 346 which is suitably connected to a rotating part of the power plant as for example shown in Fig. 1. The flyball head 342 acts against the force of a speeder spring 348 to displace the pilot valve 340 which in turn conducts fluid under pressure to the servo piston 332 to position the latter as a function of the square of the r.p.m.

As seen in Figs. 2 and 5, high pressure fluid is conducted via the line 350 continuously to the annulus 352 thus continuously urging the r.p.m. servo piston 332 toward the left. The line 350 also connects high pressure fluid via the line 354 to an annulus 356 adjacent the r.p.m. pilot valve 340. As best seen in Fig. 6, the r.p.m. pilot valve has a single controlling land 358 which when moved toward the right will pass high pressure fluid from the line 354 to the line 360 leading to a chamber 362 in the r.p.m. servo piston 332 as more clearly shown in Fig. 5. As seen in Fig. 6, drain pressure is present within the space 364 of the r.p.m. pilot valve mechanism and when the pilot valve 340 is moved toward the left drain pressure is conducted to the line 360 and the chamber 362 to thereby control movement of the r.p.m. servo piston 332. Upon movement of the servo piston 332 a follow-up beam 368 is moved about its pivot 370 to again center the pilot valve 340. In operation, increasing engine r.p.m. causes the force of the flyball 342 to increase thereby moving the pilot valve 340 to the right and exposing the r.p.m. servo piston 332 to high pressure through line 360. As the r.p.m. servo piston 332 is translated to the right, follow-up beam 368 rotates clockwise about its pivot 370 and compresses the speeder spring 348 thereby causing the pilot valve 340 to move to the left until it has reached its centered position. Decreasing r.p.m. will work in the opposite fashion.

The r.p.m. servo piston 332 and its integral cam 330 represents the maximum limiting values of $$\frac{W_F}{P_3}$$

during acceleration as shown for example in Fig. 8. As best seen in Fig. 5, for a maximum overspeed limit extreme translation of the r.p.m. servo piston 332 to the right actuates a kick-up lever 374 which operates the rod 328 which in turn actuates the maximum limit pilot valve element 322. This in turn actuates the main servo control piston 136 to decrease fuel flow at a rate which will result in some compromise droop from maximum to minimum $$\frac{W_F}{P_3}$$

settings. The amount of droop is a compromise between a sluggish operation and an over accurate control which would be unstable. This overspeed system acts in a manner identical with the operation of the maximum limiting cam 330 except that it provides for positioning the main control servo 136 according to a schedule for which a cam is impractical. Furthermore, it permits adjustment of the maximum limiting r.p.m. independently of the other limiting functions.

By adjustment of the pilot's power lever 202 a gear 380 in the upper right-hand corner of Fig. 2 is also rotated. This in turn rotates an idler gear 382 and a gear 384 having a face cam 386. The face cam 386 in turn actuates the upper end of lever 388 which is pivoted intermediate its ends at a point 390. A face cam is shown here for convenience but a peripheral cam is preferred. The lower end of the lever 388 actuates the plunger 392 of the underspeed pilot valve 294. The pivot 390 of the lever 388 is adjustable by means of a curved cam element 394 which imparts a droop characteristic to the operation of the underspeed pilot valve plunger 392 in response to the position of the main control servo piston 136. As a result the fuel control incorporates a droop type underspeed governor which has an r.p.m. setting adjustable by power lever position and which causes a rather rapid increase in fuel flow if the r.p.m. decreases for example 300 r.p.m. below the propeller governor r.p.m. setting during normal control operation. Conversely, the underspeed governor system reduces fuel flow in taking over from the maximum limit system during an acceleration as shown for example in Fig. 8 and described hereinafter. In addition, the underspeed governor pilot valve 294 controls engine speed at for example 6700 r.p.m. if the propeller blade angle reaches the low pitch stop with the power lever in for example a flight idle position.

Figure 7:
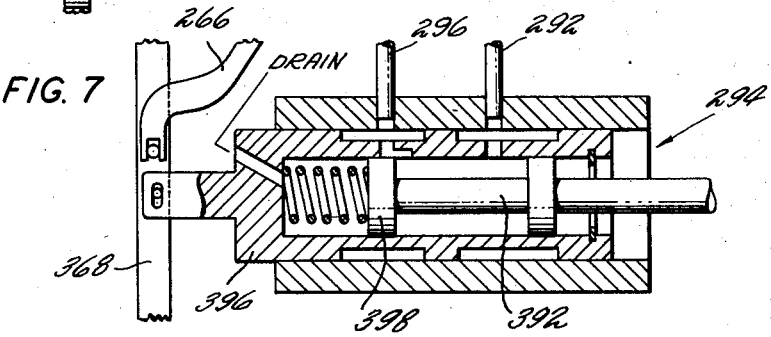
Fig. 7 is an enlarged schematic of the underspeed pilot valve.

The underspeed pilot valve 294 (seen also in Fig. 7) comprises a movable sleeve 396 and a plunger 392. The sleeve 396 is positioned as a function of engine r.p.m. by the r.p.m. servo piston 332 through the lever 368, and the plunger 392 is positioned to the desired underspeed governor setting by the power lever 202, gears 380, 382, 384, cam 386 and lever 388. An indicated r.p.m. error in the relative position of the plunger 392 and the sleeve 396 causes movement of the land 398 which will pass either high or low pressure fluid to the line 296 and eventually to the chamber 140 to cause displacement of the main control servo piston 136 to vary fuel flow in the proper direction to match the engine r.p.m. against the desired r.p.m. Motion of the main control servo piston 136 feeds back to the underspeed governor pilot valve to the follow-up lever and cam 394 which schedules the correct r.p.m. droop into the underspeed governor operation as represented by the various slopes of the vertical lines shown in Fig. 8.

It is best to refer to Fig. 8 and Fig. 2 to obtain a more clear understanding of how this fuel control operates. First of all it should be noted that for the Beta regime operation the r.p.m. is controlled by the underspeed governor which selects the $$\frac{W_F}{P_3}$$

along the appropriate droop line to balance the load imposed by the propeller at its scheduled blade angle. A stop 400 which engages the main servo piston 136 adjacent its bottom portion limits the downward movement of the main servo piston 136 to establish a minimum value of $$\frac{W_F}{P_3}$$

to protect the engine against flame-out during low power operation. Power plant protection for compressor surge and over temperature during acceleration is provided by the maximum limit system particularly the maximum limit pilot valve 192.

During a rapid engine acceleration movement of the power lever 202 for example to a military rated position actuates two control mechanisms, i.e., the normal control three-dimensional cam 210 is rotated to call for the military setting of $$\frac{W_F}{P_3}$$

and the underspeed governor face cam 386 is rotated at the same time for a similar setting of the underspeed governor which is coordinated to be set at for example 300 r.p.m. below the setting of the propeller governor. As a result of this new position the underspeed governor plunger 392 is moved to the right thereby setting up an indicated r.p.m. error between the plunger 392 and its cooperating sleeve 396 so that the metering land 398 is moved to expose line 296 to drain fuel pressure.

At the same time the rotation of the normal control cam 210 causes the cam follower lever 262 to rotate clockwise about its fixed pivot 264 and moves the right-hand end of the lever 262 downward. This motion is transmitted through the roller yoke link 270, 272 causing the left-hand end of lever 268 to move downward thereby moving the normal control pilot valve element 278 down and causing its metering land to open line 282 to drain pressure. With the main control servo piston 136 originally positioned to schedule $$\frac{W_F}{P_3}$$

values below the limiting values the maximum limit plunger 322 is positioned to connect lines 282 and 284 so that the chamber 140 of the main control servo is exposed to drain pressure causing the servo piston 136 to move upwards to schedule high pressure or $$\frac{W_F}{P_3}$$

for acceleration. The upward movement of the control servo piston 136 causes the right-hand end of the follow-up lever 268 to move upwardly thereby moving the normal control pilot valve element 278 into its cooperating sleeve and connecting lines 282 and 296 the latter being vented to drain fuel pressure through the underspeed governor pilot valve as previously described. Until the limiting values of $$\frac{W_F}{P_3}$$

are reached the maximum limit pilot valve plunger 322 allows the main control servo to be exposed to drain fuel pressure to line 284. Then as the right-hand end of follow-up lever 326 moves upward in a manner similar to that described for the follow-up lever 268, the maximum limit pilot valve plunger 322 positions the control servo in the first phase of engine acceleration to the limiting $$\frac{W_F}{P_3}$$

schedule as established by the ordinates of the maximum limit three-dimensional cam surface 330 (the r.p.m. and temperature servo device). This positioning is accomplished by exposing the main control servo piston 136 and its control chamber 140 to high fuel pressure via the line 284 and the line 320 or vice versa to drain fuel pressure via line 284 and line 282 leading from the normal control pilot valve. As the r.p.m. increases the three-dimensional cam 330 and its servo piston 332 are translated to the right. This tends to reposition the maximum limit pilot valve plunger 322. In addition, translation of the r.p.m. and temperature servo piston 332 moves the underspeed governor sleeve 396 to the right by means of the lever connection 368. Under these changing conditions the position of the underspeed pilot valve plunger 392 is relatively fixed so that the indicated r.p.m. error initially established is reduced until engine r.p.m. reaches the setting of the underspeed governor.

At this point the maximum limit pilot valve relinquishes control of the main control servo and the underspeed governor then takes over and reduces fuel flow by metering high pressure through line 296 which by virtue of the movement of the underspeed pilot valve elements has been changed from a drain to a high pressure line. As a result the main control servo piston 136 via its chamber 140 is exposed to high pressure through lines 296, 282, and 284 since as mentioned before in the follow-up action of the main servo piston the normal control pilot valve element 278 has been positioned to connect lines 296 and 282.

As the propeller governor r.p.m. setting is approached the underspeed governor relinquishes control of the main control servo and the normal control pilot valve positions the control servo to schedule the appropriate $$\frac{W_F}{P_3}$$

for the particular turbine inlet temperature at that speed setting as a function of the normal control three-dimensional cam 210 ordinates. This transition from the underspeed governor to the normal control pilot is effected as follows: As the underspeed governor causes the control servo to move downward to reduce fuel flow in accordance with the droop characteristic of the governor, the follow-up lever 268 moves the normal control pilot valve plunger 278 downwardly thereby allowing the metering land to alternately expose the control servo piston 136 to drain or high pressure via lines 282 and 284. It should be added that for power lever positioning changes in the normal governing regime, the normal control pilot valve schedules the fuel flow except when overridden by the maximum limit system.

A typical acceleration can be more readily shown by reference to Fig. 8. Assuming that power plant is operating at a point A and the power lever is moved to for example an 80° position, this is tantamount to shifting the droop line 410 to the position of droop line 412. The fuel control will then attempt to move from point A vertically to an intercept point with droop line 412 in space. Hence as shown by the arrows pointed vertically from point A, where these arrows intercept the compressor surge lines as represented by the engine inlet temperature lines, the maximum limit pilot valve and other limit mechanisms take over so that the control increases fuel flow along the maximum limit line to a point B. At this point the underspeed governor control takes over and reduces fuel flow along, for example, the droop line 412 until it intercepts the proper normal control line for the given temperature and eventually equilibrium will be reached at a point C.

During large decelerations, say for example the power lever is suddenly moved back so that there is a shift back to the position of droop line 410 and the operating point A from which it was increased, the underspeed governor pilot valve will be reset and a speed error indicated. The entire operation then is similar to but opposite to the action described for an acceleration operation. Under these conditions the fuel control will operate from point C vertically downward as shown by the arrows. In other words the control wants to intercept droop line 410 at some point in space but eventually will reach point D which is on the minimum fuel flow line defined by the stop 400 on the main servo control in order to prevent flame-out. The fuel control will then operate along this minimum fuel flow line as speed reduces until the appropriate droop line 410 for example is intercepted and the control will then operate along this droop line as shown by the arrows until it arrives again at an operating point A.

As viewed in Fig. 2 in the lower central portion of the fuel control casing a torque limiting device generally indicated at 420 is provided. The torque limiting device includes diaphragms 422 and 424 both fixed to a stem 426 the right-hand end of which seats on a valve opening 428. Ambient air pressure is admitted to the chamber 430 by means of a line 432 while engine inlet total pressure is admitted to the chamber 434 by means of a line 436. The compressor discharge pressure signal which is conducted to the compressor discharge bellows 152 via line 150 is further conducted via the line 438 to the chamber 440 in the torque limiting device. For any given power setting the engine inlet pressure will vary with variations in forward speed. Therefore, variations in torque output of the power plant will ensue. It is therefore necessary to limit the torque developed by the power plant to protect the propeller reduction gearing and associated mechanisms. Hence, when the difference in ambient pressure and engine inlet total pressure exceeds a predetermined amount, the stem 426 of the torque limiting device will move toward the left to uncover the valve opening 428 and bleed pressure from the adjacent chamber 440 to a suitable drain area via the line 442. The effect of this bleeding is to cause the compressor discharge pressure signal which leads to the bellows 152 to be modified sufficiently to reduce fuel flow and prevent excessive torque from being transmitted to the propeller reduction gearing. Actually, torque limiting in this type of mechanism is provided by placing a maximum limit of the pressure signal ($P_3$) fed to the bellows 152 and this maximum is varied as a function of ram pressure rise.

Figure 9:
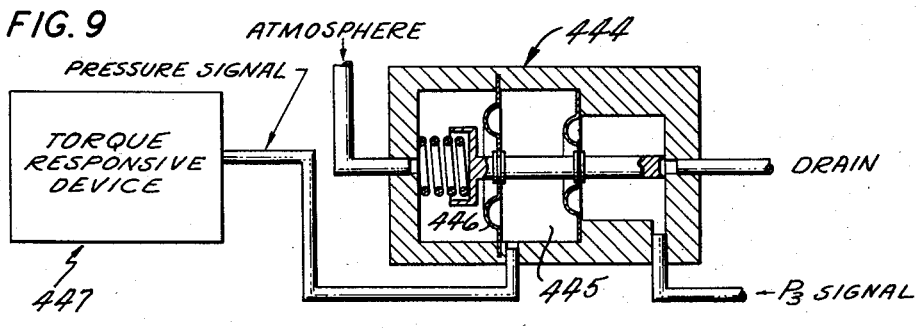
Fig. 9 is a schematic illustration of a modified torque limiting device.

This type of limiting mechanism may be substituted for by a device such as shown in Fig. 9. Herein the diaphragm arrangement generally indicated at 444 is similar to that shown in Fig. 2 excepting that only one pressure signal is conducted to the chamber 445 on the right side of diaphragm 446 while the left side of the diaphragm is exposed to the atmosphere. The pressure signal is generated by a torque responsive device generally indicated at 447 which is operatively connected to the power plant. The torque responsive device may be of the type shown in the patent to Hobbs et al., No. 2,426,879, or the patent to Newcomb, No. 2,444,363.

As seen in Fig. 2, adjacent the approximate center of the right-hand casing wall of the fuel control, a shut-off valve 450 is illustrated. This includes a double acting valve 452 biased in a closed direction by a spring 454. High pressure fluid is continuously conducted to the left-hand side of the valve 452 while high or low pressure may be conducted to the right-hand side of the piston 452 via the line 456 leading from a pilot valve 458 in the upper right-hand corner of the drawing. When the pilot valve 458 is moved upwardly, drain pressure fluid is conducted from the drain opening 460 to the line 456 and to the right side of the shut-off valve 452. The pressure on the left side of the valve 452 is sufficient to overcome the force of the spring 454 and move the valve to the right to an on position. Movement of the shut-off pilot valve 458 downwardly conducts high pressure fluid from the line 464 to the line 456 to the right side of the valve 452 where due to the increased area and also the spring force the shut-off valve 452 is moved to the left or off position. A solenoid 468 is provided so that when the manual propeller feathering system is actuated the solenoid is energized to move the shut-off pilot valve 458 to a closed position. Under these conditions a detent 470 is engaged by a latch 472 which holds the pilot valve 458 in a downward or off position. The shut-off lever 471 operable by the pilot controls the rotational movements of a shaft 474 which includes a cam face 476 engaging a bell crank element 478. The element 478 also engages the stem of the shut-off pilot valve 458, thus the shut-off pilot valve 458 is manually operable by the shut-off lever. Once the pilot valve 458 is held in an off position by the detent and latch mechanism 470, 472, it can be released by movement of the shut-off lever to the off position. This will cause the member 478 to rotate clockwise about its pivot 480, force the latch 472 to the right out of engagement with the detent 470.

At the top of Fig. 2 a spring loaded pin 486 is illustrated. The purpose of this pin is to engage with the passage 488 to index the power shaft 200 at a desired power control setting as for example the flight idle position. Thus the other coordinating controls can be adjusted accordingly.

In the upper right-hand corner of Fig. 2 a switch 490 is schematically illustrated as having a portion thereof engageable with the cam surface 476. This provides for automatically turning on and off of the ignition circuit of the power plant with movement of the power control lever 202.

As a result of this invention it is apparent that a rugged yet highly accurate fuel control system has been provided for scheduling fuel flow to the power plant over a wide range of operative conditions. Furthermore, fuel flow is controlled in accordance with desired scheduled characteristics.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In a fuel flow regulating device for a power plant, a source of fuel under pressure, fuel valve means downstream of said source for regulating the flow of fuel to the power plant, a device for setting the power of the power plant, a speed regulating device, an inlet temperature sensing device, a compressor discharge pressure sensing device, control means operatively connected to said pressure sensing device and responsive to a function of power setting and inlet air temperature biased by speed of the power plant for controlling said regulating means per unit value of compressor discharge pressure during steady state conditions, means forming a part of said control means for limiting fuel flow as a combined function of speed and temperature per unit value of compressor discharge pressure, first means for limiting fuel as a function of speed per unit compressor discharge pressure at speeds above a predetermined value, and second means forming a part of said control means responsive to speed per unit compressor discharge pressure for controlling said regulating means at speeds below a predetermined value.

2. In a propeller and turbine power plant combination, the propeller including variable pitch blades and the power plant including a compressor and a burner section, a source of fuel under pressure, means for regulating the flow of fuel from said source to said burner section including at least one element movable in two directions, a power lever, a cam movable in a plurality of directions in response to the setting of said power lever and a temperature in the power plant, a first means movable in response to movement of said cam, a second cam movable in response to a power plant temperature and the speed of the power plant, a second means movable in response to movement of said second cam, means for interconnecting said movable means, a servo motor operatively connected to said interconnecting means and controlled thereby, means responsive to compressor pressure including a second servo motor, means combining the output of said servo motors for controlling said regulating means, speed responsive means for solely controlling said regulating means when the speed of said turbine is below a predetermined value and said propeller blades are in a minimum pitch position, and means for limiting the maximum torque output of the power plant including mechanism for modifying the operation of said second servo motor.

3. In a propeller and turbine power plant combination, the propeller including variable pitch blades and the power plant including a compressor and a burner section, a source of fuel under pressure, means for regulating the flow of fuel from said source to said burner section including at least one element movable in two directions, a power lever, a cam movable in a plurality of directions in response to the setting of said power lever and a temperature in the power plant, a first means movable in response to movement of said cam, a second cam movable in response to a power plant temperature and the speed of the power plant, a second means movable in response to movement of said second cam, means for interconnecting said movable means, a servo motor operatively connected to said interconnecting means and controlled thereby, means responsive to compressor pressure including a second servo motor, means combining the output of said servo motors for controlling said regulating means, means for limiting the flow of fuel including mechanism responsive to speed and temperature, speed responsive means for solely controlling said regulating means when the speed of said turbine is below a predetermined value and said propeller blades are in a minimum pitch position, and means for limiting the maximum torque output of the power plant including mechanism for modifying the operation of said second servo motor.

4. In a fuel flow regulating device for a power plant, a source of fuel under pressure, means for regulating the flow of fuel to said power plant including an orifice, regulator means for varying the effective area of said orifice, power setting means, means responsive to speed of the power plant, the position of said power setting means, and temperature for normally controlling said regulating device, means responsive to speed and temperature for controlling said regulating means and governing the maximum effective area of said orifice, and means responsive solely to speed of the power plant for selectively taking over control from and relinquishing control to both said controlling means.

5. In a fuel flow regulating device according to claim 4 including means responsive to compressor discharge pressure for modifying the effect of said regulating means.

6. In a fuel flow regulating device for a power plant, a source of fuel under pressure, means for regulating the flow of fuel to said power plant including an orifice, regulator means for varying the effective area of said orifice, power setting means, means responsive to speed of the power plant, the position of said power setting means, and temperature for normally controlling said regulating device, means responsive to speed and temperature for controlling said regulating means and governing the maximum effective area of said orifice, and means responsive solely to speed of the power plant for selectively taking over control from and relinquishing control to both said controlling means at a predetermined high overspeed condition, and means responsive to speed and speed setting for taking over control from and relinquishing control to said controlling means at below maximum speed ranges.

7. In a fuel flow regulating device for a power plant, a source of fuel under pressure, means for regulating the flow of fuel to said power plant including an orifice, regulator means for varying the effective area of said orifice including a servo device, power setting means, means responsive to speed of the power plant, the position of said power setting means, and temperature for normally controlling said servo device, means responsive to speed and temperature for controlling said regulating means and governing the maximum effective area of said orifice, and means responsive solely to speed of the power plant for selectively taking over control from and relinquishing control to both said controlling means.

8. In a fuel flow regulating device according to claim 7 including means responsive to compressor discharge pressure for modifying the effect of said servo device.

9. In a turboprop power plant combination, a compressor, a burner receiving air from said compressor, a turbine driven by the gases discharged from the burner, a shaft driven by said turbine, a variable pitch propeller driven by said shaft, a source of fuel under pressure, a device for regulating the flow of fuel from said source to said burner, means responsive to compressor pressure and a plurality of parameters of power plant operation for controlling said device including a chamber receiving a pressure signal, and means responsive to power plant inlet pressure for modifying the pressure signal to limit torque output of the power plant.

10. In a turboprop power plant combination, a compressor, a burner receiving air from said compressor, a turbine driven by the gases discharged from the burner, a shaft driven by said turbine, a variable pitch propeller driven by said shaft, a source of fuel under pressure, a device for regulating the flow of fuel from said source to said burner, means responsive to compressor pressure and a plurality of parameters of power plant operation for controlling said device including a chamber receiving a pressure signal, and means responsive to compressor inlet pressure and ambient pressure for bleeding the pressure signal to limit fuel flow and limit maximum torque output.

11. In a turboprop power plant combination, a compressor, a burner, a turbine for driving the compressor, a variable pitch propeller driven by the turbine including governor means therefor, a source of fuel under pressure, means for regulating the flow of fuel from said source to said burner including an orifice and servo operated means for varying the area of said orifice, a power setting device, cam means movable in one plane in response to the positioning of said setting device, means responsive to a temperature including a servo device for moving said cam in another plane, a first means positioned by said cam means, a second cam means movable in one plane in response to temperature, means responsive to speed including a servo device for moving said second cam means in another plane, a second means positioned by said second cam means, speed responsive means including a servo motor, a third means positioned by said last mentioned servo, means interconnecting said first, second and third means for controlling said servo operated means for varying the area of said orifice and including at least one control valve, servo operated means responsive to compressor pressure for further varying the area of said orifice, and torque limiting means for modifying the operation of said pressure responsive servo operated means.

12. In a turboprop power plant combination, a compressor, a burner, a turbine for driving the compressor, a variable pitch propeller driven by the turbine including governor means therefor, a source of fuel under pressure, means for regulating the flow of fuel from said source to said burner including an orifice and servo operated means for varying the area of said orifice, a power setting device, cam means movable in one plane in response to the positioning of said setting device, means responsive to a temperature including a servo device for moving said cam in another plane, a first means positioned by said cam means, a second cam means movable in one plane in response to temperature, means responsive to speed including a servo device for moving said second cam means in another plane, a second means positioned by said second cam means, speed responsive means including a servo motor, a third means positioned by said last mentioned servo, means interconnecting said first, second and third means for controlling said servo operated means for varying the area of said orifice and including at least one control valve, servo operated means responsive to compressor pressure for further varying the area of said orifice, and means for modifying the operation of said pressure responsive servo operated means.

References Cited in the file of this patent

UNITED STATES PATENTS

| | | |
|---|---|---|
| 2,616,508 | Mock | Nov. 4, 1952 |
| 2,638,742 | Carey | May 19, 1953 |
| 2,645,293 | Ogle et al. | July 14, 1953 |
| 2,667,228 | Wood et al. | Jan. 26, 1954 |
| 2,670,599 | Davies et al. | Mar. 2, 1954 |
| 2,675,674 | Lee | Apr. 20, 1954 |
| 2,691,268 | Prentiss | Oct. 12, 1954 |
| 2,708,826 | Torell | May 24, 1955 |
| 2,750,734 | Anxionnaz et al. | June 19, 1956 |
| 2,759,549 | Best | Aug. 21, 1956 |
| 2,807,138 | Torell | Sept. 24, 1957 |

OTHER REFERENCES

Ser. No. 281,826 Stieglitz et al. (A.P.C.), published May 18, 1943.